Patented Oct. 25, 1949

2,485,600

UNITED STATES PATENT OFFICE 2,485,600

DERIVATIVES OF SAFROL AND ISOSAFROL

Oscar Fred Hedenburg, Pittsburgh, Pa., assignor to Harold W. Moburg, trustee, Toledo, Ohio No Drawing. Application April 1, 1946, Serial No. 658,871

4 Claims. (Cl. 260—338)

This invention relates to new derivatives of safrols and includes halomethyl and hydroxymethyl derivatives which are valuable as intermediates for the making of insecticides and synergists, as well as insecticides and synergists made therefrom.

More particularly, the invention relates to halomethyl and hydroxymethyl derivatives of safrol and isosafrol, and insecticides and synergists made therefrom.

The safrols are methylenedioxy benzene derivatives with substituents in the benzene ring, particularly aliphatic hydrocarbon constituents. In the case of safrol itself the substituent is the allyl group, safrol being 3,4-methylenedioxy allyl benzene. In the case of isosafrol the substituent is the propenyl group, isosafrol being 3,4-methylenedioxy propenyl benzene.

The new halomethyl and hydroxymethyl derivatives of safrols have the following general formula

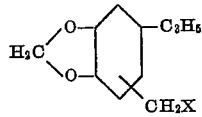

where X is halogen or hydroxyl.

The chloromethyl derivatives of safrol is a particularly valuable intermediate for use in the production of insecticides and synergists. I have found that chloromethyl safrol can be readily prepared by the reaction of formaldehyde and hydrochloric acid on safrol. The chloromethyl safrol is the methylenedioxy allyl benzyl chloride. The chloromethyl derivative of isosafrol can be similarly prepared, the chloromethyl isosafrol being methylenedioxy propenyl benzyl chloride. The chloromethyl safrols can be readily hydrolyzed to hydroxymethyl safrols.

The halomethyl safrols can be reacted with amines and with alkali salts of phenols, thiophenols, alcohols, mercaptans, acids, or the like to produce insecticides or insecticide raw materials or synergists. The alcohols which can be formed from the chlorides by saponification can be reacted with various acids, acid chlorides or acid anhydrides to give esters. When the new halomethyl and hydroxymethyl safrols are so reacted the reaction products have the following general formula

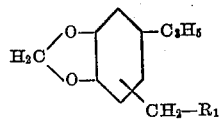

where $R_1$ is the radical or residue or nucleus of the phenol, thiophenol, alcohol, mercaptans, acid, amine, etc.

The preparation of chloromethyl safrol is illustrated by the following example, the parts being by weight:

162 parts of safrol and 400 parts of concentrated hydrochloric acid of specific gravity 1.178–1.188 were mixed and the mixture cooled to 7° C. and 100 parts of 40% formaldehyde solution added slowly, keeping the temperature from rising above 9° C., and the cooling being continued to 5° C. Then with continued stirring the temperature was allowed to rise to room temperature and the stirring was continued for 48 hours. At first the safrol tends to form an upper layer but after a time when enough chloromethyl safrol has been formed the oily layer sinks below the aqueous layer. After 48 hours the oil was dissolved in benzol, separated from the aqueous layer, the benzol solution washed with water to remove residual acid and formaldehyde, the benzol distilled off, and the oil distilled at reduced pressure and fractionated into unreacted safrol, chloromethyl safrol and a high boiling residue.

An alternative procedure for making chloromethyl safrol is to mix the safrol and formaldehyde solution, cool well and add concentrated hydrochloric acid slowly while stirring and keeping cool; or the formaldehyde solution and hydrochloric acid may be first admixed and cooled and the safrol then added.

The rate of formation of chloromethyl safrol can be somewhat increased by using a larger proportion of formalin and concentrated hydrochloric acid as illustrated by the following example, the parts being by weight:

162 parts of safrol, 125 parts of 40% formaldehyde solution, and 500 parts of concentrated hydrochloric acid are used and admixed according to the above procedure and with agitation of the mixture for a period of about 13½ hours. Similarly a mixture of 324 parts of safrol, from 260 to 360 parts of 40% formaldehyde solution, and 1000 parts of concentrated hydrochloric acid can be used with stirring and cooling and reacting for 19 to 26 hours.

The chloromethyl safrol is apparently a mixture of isomers distilling within the range of about 154 to 162° C. at 10 mm. pressure. The chloromethyl safrol crystallizes on being purified by distillation and melts in the neighborhood of 40° C. The condenser should be kept warm, otherwise it will be choked by crystals.

It will be understood that the detailed procedures of the above examples can be somewhat varied and that polymeric formaldehyde (paraformaldehyde) or formaldehyde gas may be used instead of formaldehyde solution.

The chloromethyl safrol can be reacted with various substances with replacement of the chlorine by other groups to yield compounds having insecticidal or synergistic value. The chloromethyl safrol may thus be reacted with primary or secondary amines as illustrated by the following equation:

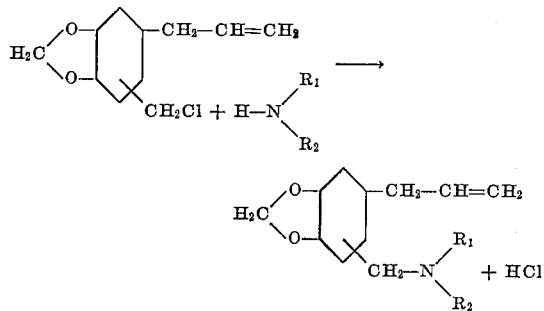

In this equation $R_1$ is hydrogen in the case of a primary amine and $R_2$ is alkyl, aryl, etc., while in the case of a secondary amine both $R_1$ and $R_2$ represent radicals or groups such as alkyl, aryl, etc.

Such a reaction is illustrated by the following example:

Morpholine was mixed with chloromethyl safrol by dissolving 27 parts by weight of chloromethyl safrol in 9 parts of benzol by heating, followed by cooling and separation of chloromethyl safrol crystals and adding 25 parts of morpholine. After the strong evolution of heat was over the mixture was heated to 100° C. for an hour and allowed to stand overnight. Water, benzol and 5 parts of solid sodium hydroxide were then added, and the benzol solution was separated and washed with water. The clarified and filtered solution was distilled at reduced pressure, and the product obtained as a light yellow oil. This oil was tested against house flies and found to have a strong insecticidal effect. A 2% solution in petroleum distillate (kerosene) knocked down 94% flies in 30 minutes. The kill was 77%. A similar petroleum distillate solution containing 500 mg. of the above product and 40 mg. of pyrethrins per 100 cc. gave 91% knockdown and 75% kill. The Official Test Insecticide (O. T. I.) containing 100 mg. of pyrethrins per 100 cc. gave 94% knockdown and 47% kill. A petroleum distillate solution containing 40 mg. of pyrethrins per 100 cc. gave a kill of 13.5%.

The chloromethyl safrol can also be reacted with the alkali salts of phenols or thiophenols or mercaptans, or with such phenols or mercaptans and alkali hydroxide to give reaction products in which the phenol or thiophenol or mercaptan residue replaces the chlorine.

Thus, allyl methylenedioxy benzyl amyl sulfide was prepared by adding a solution containing 70.2 parts of chloromethyl safrol in 80 parts of methanol gradually to a solution of 52 parts amyl mercaptan in 80 parts of methanol containing 15 parts of 95% sodium hydroxide. Heat was involved and cooling was necessary and the solution was thereafter boiled for about one hour. Water was then added and the mass was distilled with steam to remove volatile materials. The cooled product was extracted with benzol, the benzol solution washed with water and the filtered solution distilled at reduced pressure, giving the reaction product in the form of a yellow mobile oil. A petroleum distillate solution containing 300 mg. of this product and 30 mg. of pyrethrins per 100 cc. gave 57.8% kill. The O. T. I. gave 40.9% kill.

The chloromethyl safrol can also be reacted with alcohols with the addition of caustic alkali and with replacement of the chlorine of the chloromethyl safrol with an alcohol group or residue. Thus 81 parts of butyl Carbitol or diethylene glycol monobutyl ether $$(C_4H_9-O-C_2H_4-O-C_2H_4OH)$$

in 45 parts of benzol was heated with 15 parts of 95% sodium hydroxide and the water formed was boiled out with the benzol, with return of the benzol to the vessel. 52.6 parts of chloromethyl safrol dissolved in 45 parts of benzol was added to the sodium salt of the butyl Carbitol and the mixture was heated for two hours. After cooling, water was added and the benzol solution of the product with the excess butyl Carbitol was separated, filtered and distilled at reduced pressure to remove the benzol and butyl Carbitol.

This product was made in one operation by heating a mixture of 105.25 parts of chloromethyl safrol (½ mol), 121.5 parts of butyl Carbitol (¾ mol), 21.5 parts sodium hydroride U. S. P. chip 95% (½ mol) and 45 parts of benzol. The sodium hydroxide was added to the solution in portions, with 10 parts at the start of reaction, 5 parts added after 45 minutes, and 6.5 parts added 30 minutes later, and boiled for seven and one-half hours. After cooling, water and more benzol were added, the benzol solution was washed free from alkali with water, filtered and distilled at reduced pressure to remove benzol and excess butyl Carbitol.

A further method for making this product was to mix 105.25 parts of chloromethyl safrol (½ mol), 81 parts of butyl Carbitol (½ mol), 21.5 parts U. S. P. chip sodium hydroxide 95% (½ mol) and 45 parts of benzol, and boil for nine hours, followed by separation of the product as above described.

The product, butoxy ethoxy ethoxy methyl allyl methylene dioxy benzene was found to be a synergist with pyrethrins. A petroleum distillate solution containing 2% of this product gave 92% knockdown in 30 minutes and 92% kill. A petroleum distillate solution containing 300 mg. of this product and 30 mg. of pyrethrins per 100 cc. gave 96.3% knockdown and 94.8% kill. The O. T. I. gave 92.2% knockdown and 55.1% kill.

The benzyloxy ethoxy methyl allyl methylenedioxy benzene was prepared from benzyl Cellosolve, $C_6H_5CH_2OC_2H_4OH$, and chloromethyl safrol in a similar manner. To 40 parts of benzyl Cellosolve was added 11 parts sodium hydroxide U. S. P. chip 95%, and the mixture was heated to 115° C. After cooling there was added 33 parts of benzol and the solution was boiled for eight and one-half hours. There was then added 52.6 parts of chloromethyl safrol dissolved in 45 parts of benzol and the mixture was boiled for about four and one-half hours. The product was recovered in benzol solution which was washed with water, filtered and the benzol distilled off at reduced pressure. The product gave copper wire test for chlorine and was boiled with 50 cc. benzol and 2 g. sodium hydroxide for two hours.

A petroleum distillate solution containing 300 mg. of this product and 30 mg. of pyrethrins per 100 cc. gave 95% knockdown and 89% kill. The O. T. I. gave 96% knockdown and 54% kill.

The phenoxy ethoxy methyl allyl methylenedioxy benzene was prepared from phenyl Cellosolve, $C_6H_5OC_2H_4OH$, and chloromethyl safrol in a similar manner, and also had synergistic and insecticidal value.

In preparing this product, a mixture of 36.2 parts of phenyl Cellosolve, 12 parts of sodium hydroxide U. S. P. chip 95% and 68 parts of benzol was boiled for about eight hours, with removal of water of reaction. There was added 52.6 parts of chloromethyl safrol dissolved in 45 parts of benzol, and the mixture was boiled eleven hours. There was a trace of chlorine by copper wire test in the product and it was boiled for four hours with 50 cc. of benzol and 2 g. of sodium hydroxide. The product contained no chlorine.

The allyloxy propyl thioethoxymethyl allyl methylenedioxybenzene was prepared from allyloxy propyl thioethyl alcohol,

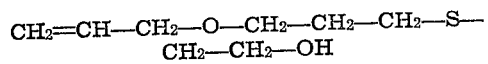

and chloromethyl safrol in a similar manner. It has insecticidal and synergistic value.

In preparing this product a mixture of 44 parts of allyl oxypropyl thioethyl alcohol, 52.6 parts of chloromethyl safrol, 11 parts of sodium hydroxide U. S. P. chip 95% and 45 parts of benzol was boiled for eleven and one-half hours, with removal of water of reaction. The product was recovered in benzol, washed with water, filtered and the benzol distilled off at reduced pressure, and gave no test for chlorine by the copper wire test.

The decycloxy methyl allyl methylene dioxybenzene was prepared from decyl alcohol, $$CH_3(CH_2)_9OH$$

and chloromethyl safrol in a similar manner and has insecticidal and synergistic value. This product was prepared as follows: A mixture of 52.6 parts of chloromethyl safrol, 39.5 parts of n-decyl alcohol, 11 parts sodium hydroxide U. S. P. chip and 32 parts of benzol was boiled for twenty hours. The product was recovered by benzol solution from which the benzol was distilled at reduced pressure.

In making the chloromethyl safrol in the manner above described there are also produced higher molecular weight compounds which remain as a residue from the distillation and fractionation of the reaction mixture. This residue also has insecticidal and synergistic value. A petroleum distillate solution containing about 500 mg. of this residue and 40 mg. of pyrethrins per 100 cc. gave 80.7% knockdown and 58.9% kill. The O. T. I. gave 85.9% knockdown and 45.2% kill.

This residue contains chloromethyl groups and can be further reacted much the same as chloromethyl safrol to form new reaction products. Thus this residue can be reacted with butyl Carbitol in much the same manner that chloromethyl safrol is reacted with butyl Carbitol in the example given above.

This reaction product was prepared as follows: A mixture of 61 parts of the residue from making chloromethyl safrol, 40 parts of butyl Carbitol, 11 parts of sodium hydroxide U. S. P. chip and 45 parts of benzol was boiled for nine hours, with removal of water of reaction. The product was recovered by benzol, and the benzol solution was distilled at reduced pressure to remove the benzol, giving 73 parts of the reaction product.

A petroleum distillate containing 300 mg. of such reaction product and 30 mg. of pyrethrins per 100 cc. gave 98% knockdown and 78% kill. The O. T. I. gave 99% knockdown and 50% kill.

Chloromethyl isosafrol can similarly be made by the procedure above described for making chloromethylsafrol, as illustrated by the following example and with the parts being by weight:

324 parts of isosafrol and 300 parts of 40% formaldehyde solution were mixed and stirred and cooled while adding 1000 parts of concentrated hydrochloric acid and further agitated for 18 hours. The resulting crude product was extracted with benzol, distilled and fractionated. The chloromethyl isosafrol distilled between 165 and 188° C. at about 12 mm. pressure. It is a thick liquid which polymerizes slowly on standing.

The chloromethyl isosafrol can be used in a similar manner to that above described for chloromethyl safrol in making reaction products. It can thus be reacted, for example, with butyl Carbitol in a manner similar to that above described for reacting chloromethyl safrol with butyl Carbitol to give the butoxy ethoxy ethoxy methyl propenyl methylene dioxybenzene.

This product was made as follows: A mixture of 52.6 parts of chloromethyl isosafrol, 40.5 parts of butyl Carbitol, 11 parts sodium hydroxide U. S. P. chip and 23 parts of benzol was boiled for 11 hours, with removal of water. The product was recovered by benzol solution which was washed, filtered and distilled at reduced pressure to remove the benzol.

A petroleum distillate solution containing 300 mg. of this product and 30 mg. of pyrethrins per 100 cc. gave 56.5% kill. The O. T. I. gave 50% kill.

The hydroxymethyl derivatives of safrols which may be produced by saponification of the chloromethyl derivatives can also be used as intermediates for producing ester derivatives.

It will thus be seen that the halomethyl and hydroxymethyl derivatives of safrols are valuable products, particularly for use as intermediates in the production of insecticides or insecticide ingredients or synergists and that a wide range of new products can be produced therefrom.

I claim:

1. The compounds of the generic formula

in which R is a substituent selected from the group consisting of the allyl radical and the propenyl radical and X is a substituent selected from the group consisting of the chlorine atom and the hydroxyl radical.

2. The compounds of the generic formula

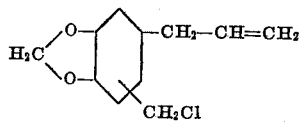

3. The compounds of the generic formula

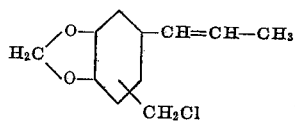

4. The compounds of the generic formula

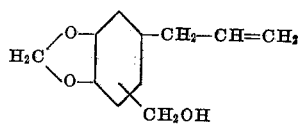

OSCAR FRED HEDENBURG.

REFERENCES CITED

The following references are of record in the file of this patent:

UNITED STATES PATENTS

| Number | Name | Date |
|---|---|---|
| 2,421,569 | La Forge et al. | June 3, 1947 |

OTHER REFERENCES

Adams et al., Organic Reactions, vol. I, chap. 3-J; Wilen & Sons (1942).

Thorpe-Dict. of Applied Chem., vol. VI, page 12.

Prill et al., Contrib. of Boyce Thompson Instit., Jan.-Mar. (1946).